A. RITTERSHAUSSEN.
ELECTRIC HEAT ACCUMULATOR.
APPLICATION FILED JAN. 4, 1912.
1,070,734. Patented Aug. 19, 1913.
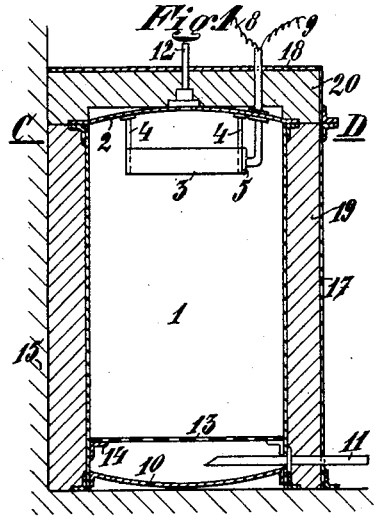
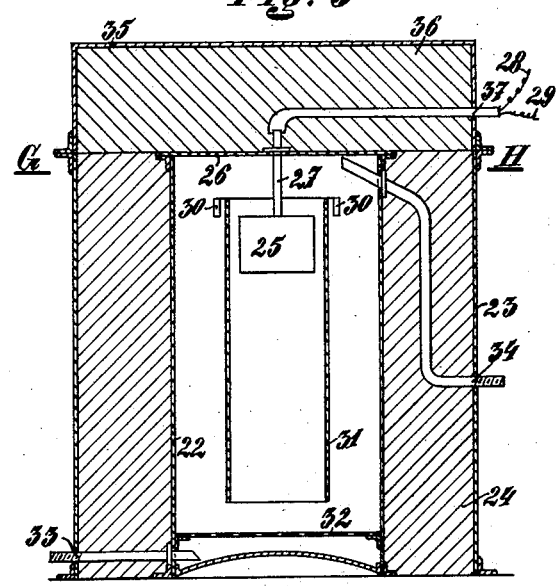
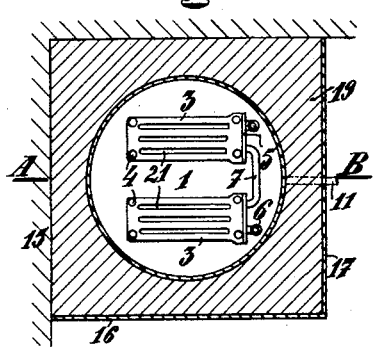
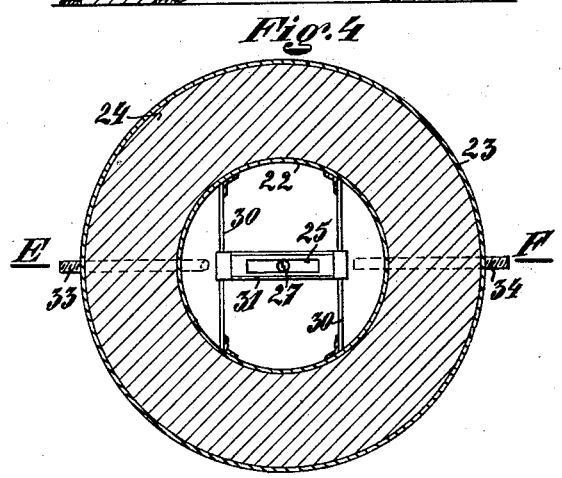
Witnesses:
Inventor:
Adolph Rittershaussen

UNITED STATES PATENT OFFICE.

ADOLPH RITTERSHAUSSEN, OF CASSEL, GERMANY.

ELECTRIC HEAT-ACCUMULATOR.

1,070,734.      Specification of Letters Patent.      Patented Aug. 19, 1913.

Application filed January 4, 1912. Serial No. 669,469.

*To all whom it may concern:*

Be it known that I, ADOLPH RITTERSHAUSSEN, a citizen of the Empire of Germany, residing at Cassel, in the Empire of Germany, have invented a new and useful Electric Heat-Accumulator, of which the following is a specification.

In numerous plants the power at disposal can be fully utilized only periodically, as is for example the case with nearly every electric central station driven by means of water turbines, so that in the pauses power is wasted by the water flowing off without having been made profit of, since electric accumulators can be utilized only within very narrow limits for storing up energy, in case direct current is produced, while for alternating current no accumulators are known, which could be utilized.

My invention relates to an electric heat accumulator adapted to store up in the pauses heat, into which the energy obtained from or produced by the power at disposal has been turned. In this electric heat accumulator water is best used as a medium for storing up heat, since the water absorbs a large quantity of heat before commencing to boil, as is well known.

The new accumulator essentially consists of a closed preferably cylindrical vessel filled with water, a protecting mantle of a bad heat conducting material surrounding the vessel, an electric heater disposed within the vessel for heating the water in the upper part of the vessel, and means for admitting cold water to the vessel below and for leading off hot water from the vessel above. Preferably a false bottom, that is a perforated plate, is disposed in the vessel near its bottom above the point, where the cold water enters the vessel, so as to prevent the formation of whirls, in other words to prevent an excessive circulation of the water in the vessel. The electric heater is moreover so constructed or arranged as to produce but a feeble or moderate circulation of the water. Then in contradiction to ordinary heating apparatus the water will be heated in the upper part of the vessel and will maintain its maximum temperature, while in the lower part of the vessel the water may be still cold. Only in proportion as the heating of the water goes on an increasing quantity of the water will be brought to the maximum temperature, so that the hot water may eventually extend downward to the bottom. When hot water is discharged from the top of the vessel for the consumption, cold water will enter the vessel and replace the hot water. In this manner a constant supply of hot water can be obtained from the new electric heat accumulator, no matter whether the consumption be large or small. The water heated in the new electric heat accumulator can be utilized in plants of various descriptions for heating by means of hot or warm water tubes both for domestic use and for industrial purposes. In this manner the new electric heat accumulator is adapted to turn the electrical energy into heat during the time in which little or nothing of the said energy is consumed, so that no waste of the power at disposal is produced.

I will now proceed to describe my invention with reference to the accompanying drawing, in which—

Figure 1 is a vertical longitudinal section through an electric heat accumulator on the line A—B in Fig. 2, Fig. 2 is a horizontal section through the same on the line C—D in Fig. 1, Fig. 3 is a vertical longitudinal section through a modified form of the electric heat accumulator on the line E—F in Fig. 4, and Fig. 4 is a horizontal section through the same on the line G—H in Fig. 3.

Similar characters of reference refer to similar parts throughout the several views.

The electric heat accumulator illustrated at Figs. 1 and 2 essentially consists of a closed cylindrical vessel 1 with detachable cover 2 and two electric heaters 3, 3 of any approved construction. The heaters 3, 3 are shown to be suspended from the cover 2 by means of suitable connections 4, 4 and to have each a cover 5, to which inner parts (not shown) may be attached, so that by removing the cover 2 also the electric heater can be withdrawn. The cover 5 of each heater 3 can be connected with the cover 2 of the vessel by means of a detachable bent tube 6 and the two heater covers 5, 5 may be connected together by means of a bent tube 7, so that conductors 8 and 9 for supplying and leading off the electric current can pass through the said tubes to the inner parts. Cold water can enter the vessel 1 near its bottom 10 through a tube 11, as is indicated by an arrow, while hot water can escape from the vessel 1 through a tube 12 secured on the cover 2. A false bottom 13, that is a perforated plate, is disposed within the vessel above the inlet tube 11 on a suitable supporting ring 14. The vessel 1 is preferably surrounded with a mantle of a bad heat conducting material. In Figs. 1 and 2 this mantle is shown to consist of the walls 15 of some room, into one corner of which the vessel 1 is placed, further two vertical plates 16, 17 connected together at right angles to one another and secured to the walls 15, and a removable cover 18. The space between the vessel 1, the walls 15 and the plates 16, 17 is filled up with a bad heat conducting material 19 of any known kind. The cover 18 may be provided with a filling 20 of a similar bad heat conducting material. The vessel 1 is filled up with water. The false bottom 13 serves for preventing the entering water from forming whirls above this plate, so that the water in the vessel is maintained as silent as possible. For the same reason the electric heaters 3, 3 are so constructed as to produce but a feeble circulation of the water, since they are flat and cause the water to flow upward through a short distance along their walls. The heaters 3, 3 are for example shown to have each three parallel vertical narrow passages 21 for the water.

It will be now evident, that by starting the electric heaters 3, 3 only the water in the upper part of the vessel 1 will be heated, so that very soon after the start hot water can be discharged upward through the tube 12 by opening some valve (not shown). The water in the lower part of the vessel 1 may remain cool or cold, it moving upward and being gradually heated, and the hot water discharged above is constantly replaced by cold water entering the vessel 1 below through the tube 11. When the water is not discharged through the tube 12, of course an increasing quantity of water will be heated to the maximum temperature by the heaters 3, 3 in proportion to the time and energy spent, so that the hot water may eventually extend downward to the bottom 10. In any case, when hot water escapes from the vessel 1 and cold water enters the vessel, the division between the hot and cold water will be maintained for a long time for want of considerable circulation.

It is an advantage of this electric heat accumulator, that the heating of the water is effected in the upper part of the vessel, as thereby the necessity of first gradually heating the whole contents of the vessel 1 is saved.

Figs. 3 and 4 show a modified form of the electric heat accumulator. The cylindrical vessel 22 is surrounded with a concentric protecting vessel 23 and an annular filling 24 between them of a bad heat conducting material. An electric heater 25 of any other approved construction is shown to be suspended from the cover 26 by means of a tube 27 through which pass two electric conductors 28, 29. Two parallel cross bars 30, 30 fastened on the inside of the vessel 22 serve for supporting a rectangular tube 31 of metallic or heat insulating material, which tube is shown to surround the heater 25 and to extend downward to a point above the false bottom 32. The cold water is supplied to the vessel 22 through a tube 33 below the false bottom 32 as before, while the hot water is discharged from the vessel 22 close to its cover 26 through the upper end of a bent tube 34, the other end of which is kept at a little less than half the height of the vessel 22, so as to maintain the heat produced as much as possible in the vessel and to prevent it from escaping when not required. The top of the vessel 22, that is the cover 26, and the top of the outer vessel 23 and filling 24 is covered with a cover 35 and a filling 36 of a bad heat conducting material. A tube 37 for the conductor 28, 29 is shown to be embedded in the filling 36. This electric heat accumulator differs from the preceding one in that the tube 31 produces a stronger circulation of the water, which may be preferable in certain cases according to the circumstances. By selecting a height for the tube 31 the circulation of the water may be predetermined, and by varying the position of the electric heater 25 in the tube 31 also the circulation of the water may be adjusted. Obviously this accumulator can be charged with heat by passing the current through the electric heater 25 during the standstill of the respective plant, so that no waste of the power at disposal is permitted to take place as hitherto. During the charging of the accumulator the water brought up to the maximum temperature leaves the upper end of the tube 31 and reposes on the upper layer of warm water, if any is already there, in which case the warm water will be uniformly forced downward in the space between the tube 31 and the inside of the vessel 22. In consequence of this not a large quantity of water having but one fourth or one half of the desired highest temperature will be at disposal, but a quantity of hot water in proportion to the time and energy spent, while the rest of the water may be still cold or cool.

The shape and construction of the electric heater 3 or 25 is immaterial to my invention. The heater may be round instead of rectangular or have any other shape. The essential point is in all cases, that by means of the electric heater the water be heated from above downward.

In order to prevent the heat of the water produced from exceeding any determined limit, whereby otherwise a waste of energy might be produced, some known and approved device should be employed for automatically opening the current at the moment that the maximum temperature is attained.

The electric heat accumulator may be connected with a plant of any kind for giving hot or warm-water, in which case the accumulator is simply inserted in the delivery tube. Then during the consumption of the hot water invariably a like quantity of cold water will enter the accumulator at the bottom. The electric heat accumulator may serve for heating the air in some building by means of a central heating plant, in which case the water serves not only for storing up the heat, but also for conveying the heat from the accumulator to the radiators by circulating between them.

The electric heat accumulator can be varied in many respects without departing from the spirit of my invention.

Claims:

1. In an electric heat accumulator of the class described, the combination with a closed vessel adapted to be filled with water, of an electric heater with vertical perforations located in said closed vessel near the top and adapted to heat the water downward in proportion to the energy spent, means for providing said electric heater with current, an inlet tube for introducing cold water into the lower end of said vessel, an outlet tube for discharging hot water from the upper end of said vessel, a perforated plate in said vessel above said inlet tube for spreading the entering water and making the flow through the vessel more uniform, and a bad heat conductor inclosing said vessel.

2. In an electric heat accumulator of the class described, the combination with a vessel adapted to be filled with water, of a cover for closing the top of said vessel, an electric heater with vertical perforations located in said vessel near said cover and adapted to heat the water downward in proportion to the energy spent, tubes connecting said electric heater with said cover, electric conductors passing from without through said tubes and adapted to supply said electric heater with current, an inlet tube for introducing cold water into the lower end of said vessel, an outlet tube for discharging hot water from the upper end of said vessel, a perforated plate in said vessel above said inlet tube for spreading the entering water and making the flow through the vessel more uniform, and a bad heat conductor inclosing said vessel and said cover.

ADOLPH RITTERSHAUSSEN.

Witnesses:
 ERNST MEIER,
 JOHANN KERKMANN.

---

Copies of this patent may be obtained for five cents each, by addressing the "Commissioner of Patents, Washington, D. C."